US012756208B2

(12) United States Patent
Yoon

(10) Patent No.: US 12,756,208 B2
(45) Date of Patent: Oct. 6, 2026

(54) BATTERY SYSTEM

(71) Applicant: LG ENERGY SOLUTION, LTD., Seoul (KR)

(72) Inventor: Sunwoo Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 605 days.

(21) Appl. No.: 18/281,922

(22) PCT Filed: Nov. 1, 2022

(86) PCT No.: PCT/KR2022/016932
§ 371 (c)(1),
(2) Date: Sep. 13, 2023

(87) PCT Pub. No.: WO2023/090692
PCT Pub. Date: May 25, 2023

(65) Prior Publication Data
US 2024/0178677 A1 May 30, 2024

(30) Foreign Application Priority Data
Nov. 16, 2021 (KR) ........................ 10-2021-0157764

(51) Int. Cl.
*H02J 7/56* (2026.01)
*H01M 10/42* (2006.01)
(Continued)

(52) U.S. Cl.
CPC ........... *H02J 7/56* (2026.01); *H01M 10/4207* (2013.01); *H02J 7/342* (2020.01); *H02J 7/345* (2013.01);
(Continued)

(58) Field of Classification Search
CPC ........ H02J 7/56; H02J 7/342; H01M 10/4207; H01M 2010/4207
(Continued)

(56) References Cited

U.S. PATENT DOCUMENTS 10,454,283 B2 * 10/2019 Kudo ...................... B60L 50/51
2010/0164430 A1 7/2010 Lu et al.
(Continued)

FOREIGN PATENT DOCUMENTS

JP 2007-14148 A 1/2007
JP 2010-246372 A 10/2010
(Continued)

OTHER PUBLICATIONS

International Search Report for PCT/KR2022/016932 mailed on Feb. 7, 2023.
(Continued)

*Primary Examiner* — Toan C Ly
(74) *Attorney, Agent, or Firm* — Birch, Stewart, Kolasch & Birch, LLP

(57) ABSTRACT

Discussed is a battery system including: a battery pack including a plurality of battery cells; a battery monitoring integrated circuit (BMIC) configured to monitor each of a plurality of cell voltages of the plurality of battery cells; a plurality of balancing batteries each charged by a target battery cell requiring a cell balancing among the plurality of battery cells; a power conversion unit including a direct-current to direct-current (DC-DC) converter receiving voltages from the plurality of balancing batteries and configured to convert the voltages into output voltages; and a power supply unit configured to supply the output voltages to the BMIC when the output voltages have a voltage equal to or greater than a predetermined level for driving the BMIC.

14 Claims, 7 Drawing Sheets

(51) Int. Cl.
*H02J 7/34* (2006.01)
*H02J 7/65* (2026.01)
*H02J 7/96* (2026.01)

(52) U.S. Cl.
CPC ........................ *H02J 7/65* (2026.01); *H02J 7/96* (2026.01); *H01M 2010/4271* (2013.01); *H01M 2010/4278* (2013.01); *H01M 2200/106* (2013.01); *H02J 2207/10* (2020.01); *H02J 2207/20* (2020.01); *H02J 2207/50* (2020.01)

(58) Field of Classification Search
USPC .............................. 320/162
See application file for complete search history.

(56) References Cited

U.S. PATENT DOCUMENTS

| | | | |
|---|---|---|---|
| 2010/0259221 | A1 | 10/2010 | Tabatowski-Bush |
| 2012/0094151 | A1 | 4/2012 | Kim |
| 2013/0026991 | A1 | 1/2013 | Roessler |
| 2014/0042977 | A1 | 2/2014 | Kim |
| 2014/0347013 | A1 | 11/2014 | Kim |
| 2016/0164317 | A1 | 6/2016 | Lee et al. |
| 2017/0205467 | A1 | 7/2017 | Kiuchi |
| 2017/0294788 | A1 | 10/2017 | Curtis |
| 2018/0123357 | A1* | 5/2018 | Beaston .............. H01M 10/425 |
| 2019/0265304 | A1 | 8/2019 | Kim et al. |
| 2019/0379089 | A1 | 12/2019 | Kim et al. |
| 2021/0218253 | A1 | 7/2021 | Kim et al. |
| 2021/0333328 | A1 | 10/2021 | Chung et al. |
| 2022/0283244 | A1 | 9/2022 | Honda et al. |
| 2022/0294249 | A1 | 9/2022 | Noh et al. |

FOREIGN PATENT DOCUMENTS

| | | | |
|---|---|---|---|
| JP | 2013-34370 | A | 2/2013 |
| KR | 10-2011-0029883 | A | 3/2011 |
| KR | 10-1181822 | B1 | 9/2012 |
| KR | 10-2013-0040346 | A | 4/2013 |
| KR | 10-2014-0028349 | A | 3/2014 |
| KR | 10-2014-0028350 | A | 3/2014 |
| KR | 10-2016-0059193 | A | 5/2016 |
| KR | 10-2016-0069077 | A | 6/2016 |
| KR | 10-1835585 | B1 | 3/2018 |
| KR | 10-2019-0048972 | A | 5/2019 |
| KR | 10-2019-0139592 | A | 12/2019 |
| KR | 10-2133558 | B1 | 7/2020 |
| KR | 10-2204301 | B1 | 1/2021 |
| KR | 10-2021-0031318 | A | 3/2021 |
| KR | 10-2021-0070077 | A | 6/2021 |
| KR | 10-2021-0092013 | A | 7/2021 |
| KR | 10-2021-0114757 | A | 9/2021 |
| WO | WO 2018/157534 | A1 | 9/2018 |
| WO | WO 2021/111822 | A1 | 6/2021 |

OTHER PUBLICATIONS

Extended European Search Report for European Application No. 22895899.7, dated Oct. 30, 2024.

* cited by examiner

【FIG. 1】
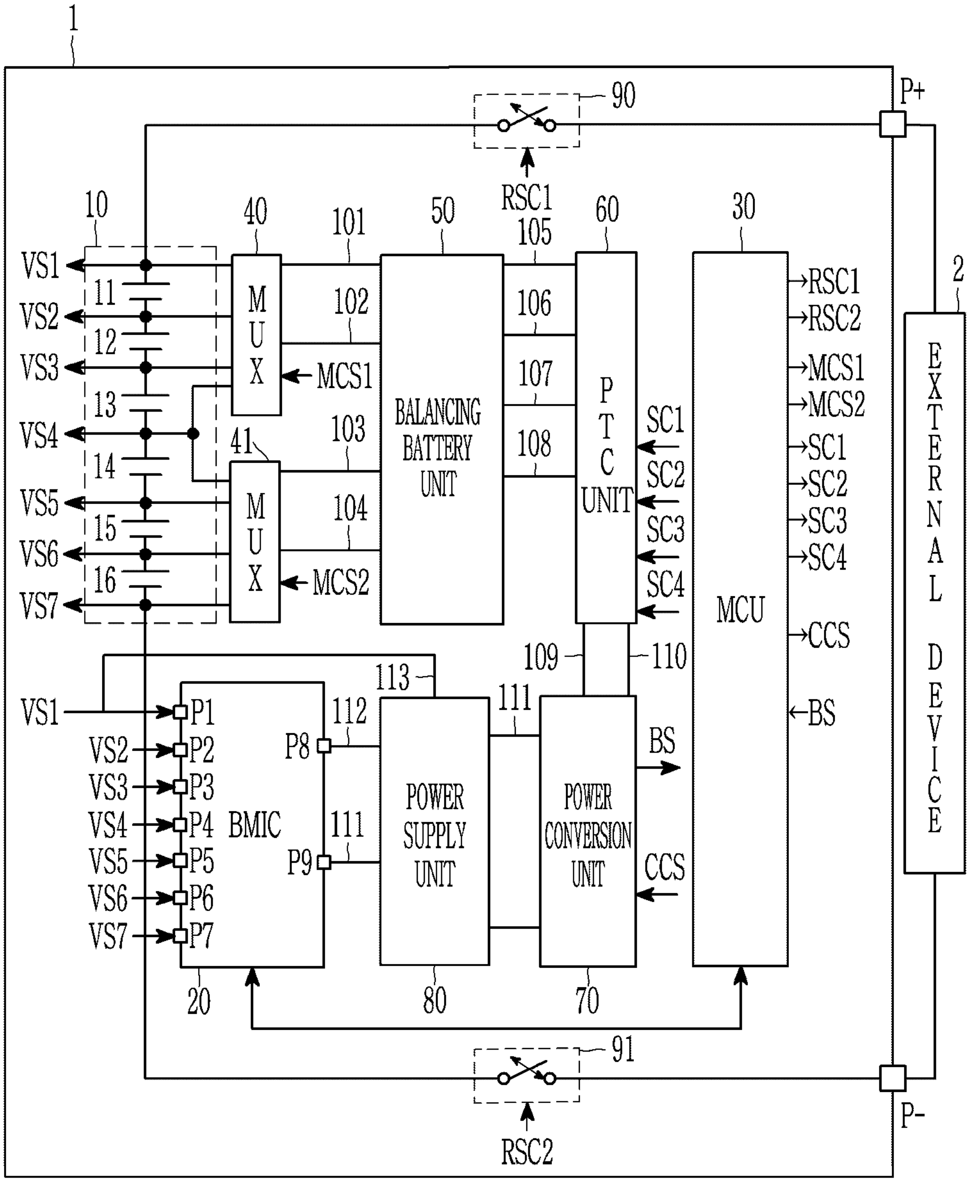

【FIG. 2】
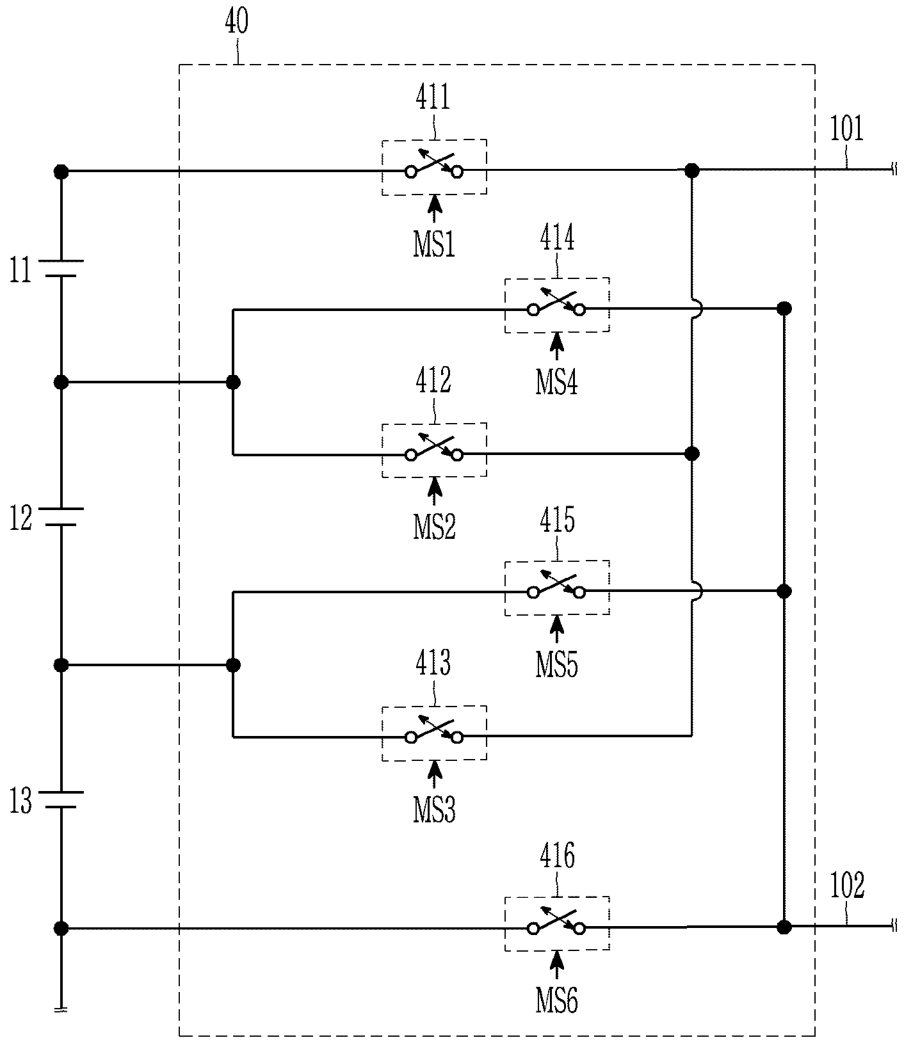

【FIG. 3】
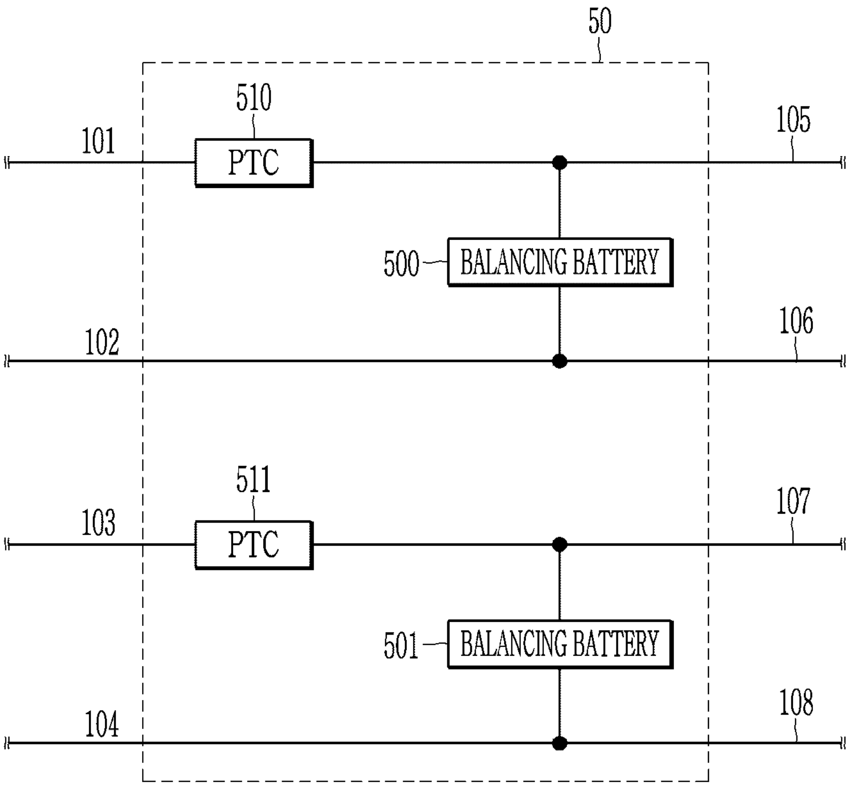

【FIG. 4】
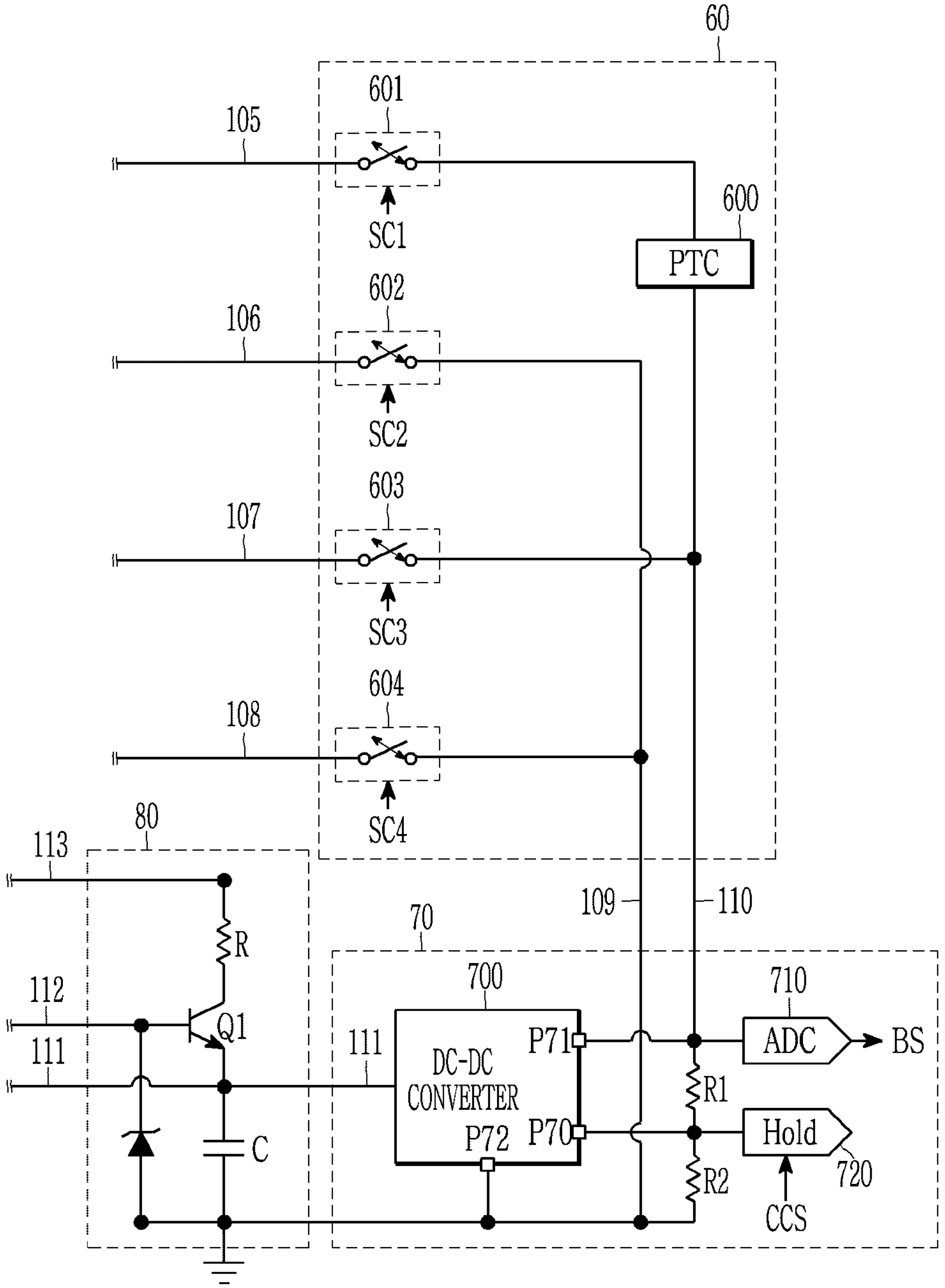

【FIG. 5】
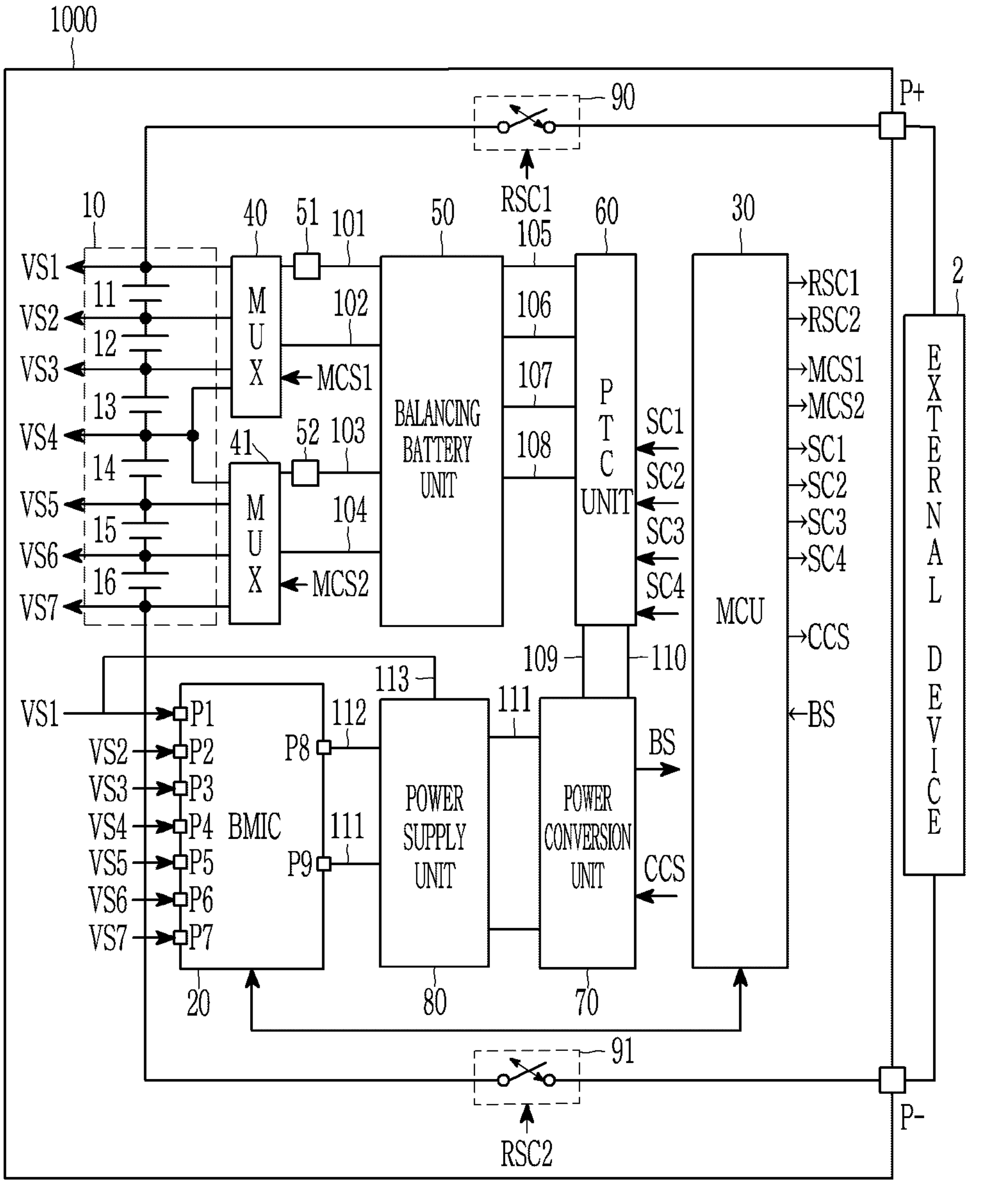

【FIG. 6】
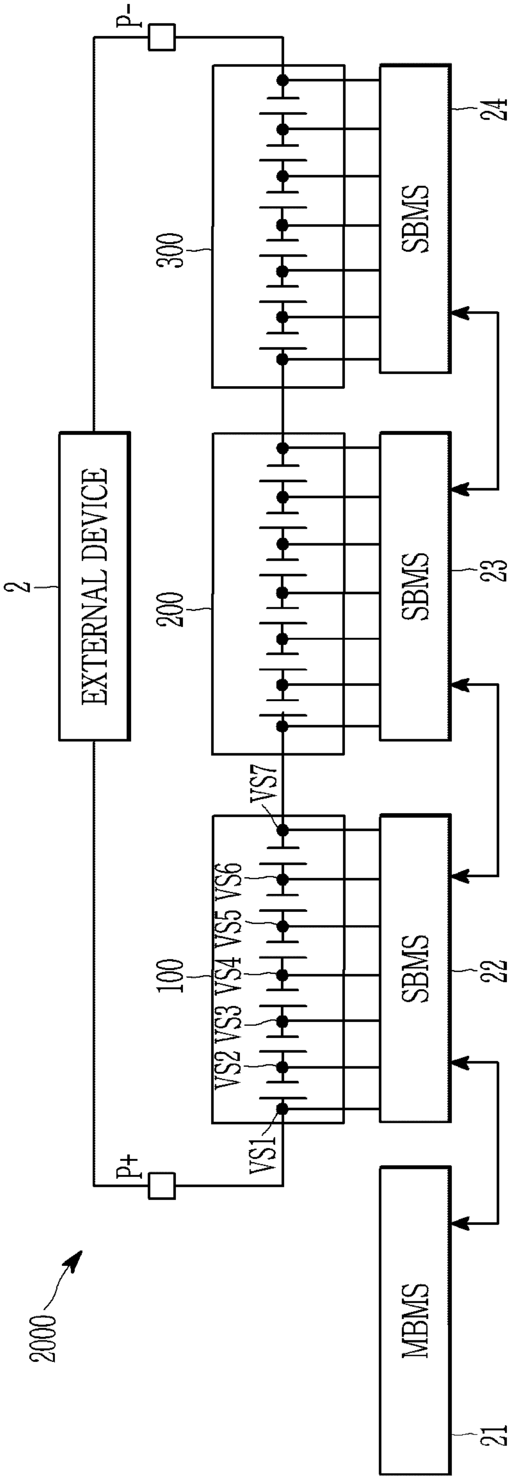

【FIG. 7】
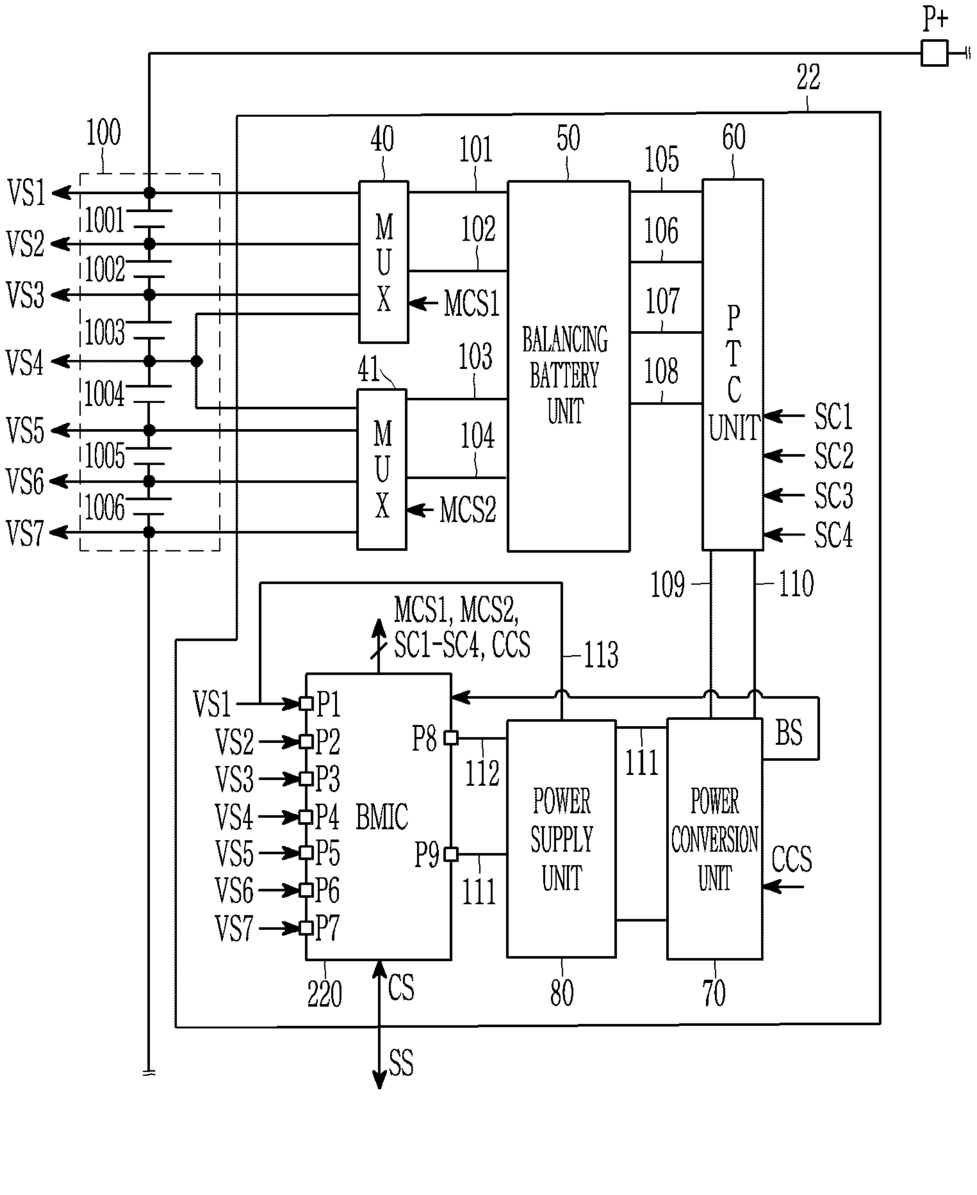

BATTERY SYSTEM

CROSS-REFERENCE TO RELATED APPLICATION(S)

This application claims benefit of priority to Korean Patent Application No. 10-2021-0157764 filed in the Korean Intellectual Property Office on Nov. 16, 2021, the disclosure of which is incorporated herein by reference in its entirety.

TECHNICAL FIELD

The present disclosure relates to a battery system.

BACKGROUND ART

A battery pack may include a plurality of battery cells connected in series and/or parallel with each other. When the battery pack includes the plurality of battery cells, a cell balancing operation may be performed to balance a voltage between the plurality of battery cells. The cell balancing operation may be implemented by discharging a current flowing in a battery cell in which a deviation occurs among the plurality of battery cells through a balancing load.

In addition, a battery monitoring integrated circuit that monitors the voltage of a battery cell may require power supply to perform a voltage monitoring operation, and also require standby power supply even during a period in which the monitoring is not performed. Therefore, a power source may be required for supplying power to the battery monitoring integrated circuit.

DISCLOSURE

Technical Problem

An embodiment of the present disclosure may provide a battery system which may supply power to a battery monitoring integrated circuit by using power consumed during a cell balancing operation between a plurality of battery cells in a battery pack including the plurality of battery cells.

Technical Solution

According to an embodiment, a battery system includes: a battery pack including a plurality of battery cells; a battery monitoring integrated circuit (BMIC) configured to monitor each of a plurality of cell voltages of the plurality of battery cells; a plurality of balancing batteries each charged by a target battery cell requiring a cell balancing among the plurality of battery cells; a power conversion unit including a direct-current to direct-current (DC-DC) converter receiving voltages from the plurality of balancing batteries and configured to convert the voltages into output voltages; and a power supply unit configured to supply the output voltages to the BMIC when the output voltages have a voltage equal to or greater than a predetermined level for driving the BMIC.

When the output voltages are less than the predetermined level for driving the BMIC, the power supply unit may regulate the voltage supplied from the battery pack to a voltage of the predetermined level for driving the BMIC and supply the voltages to the BMIC.

The battery system may further include a plurality of multiplexers (MUXs) connecting the target battery cell requiring the cell balancing among the plurality of battery cells to one of the plurality of balancing batteries.

The power conversion unit may operate the DC-DC converter when each voltage output from the plurality of balancing batteries is equal to or greater than a predetermined threshold voltage.

The power conversion unit may further include an analog-to-digital converter (ADC) configured to generate a voltage measurement signal by measuring the voltages output from the plurality of balancing batteries, and whether the plurality of balancing batteries are charged by the target battery cell may be controlled based on the voltage measurement signal.

The power conversion unit is not operated while the ADC measures the voltages output from the plurality of balancing batteries.

The battery system may further include a positive temperature coefficient (PTC) element disposed on a current path in which one of the plurality of balancing batteries is charged by the cell balancing of the target battery cell.

The battery system may further include a positive temperature coefficient (PTC) element disposed on a current path between the plurality of balancing batteries when the plurality of balancing batteries are connected in parallel with each other.

The power supply unit may include: a resistor connected to a wiring connected to the battery pack; a capacitor charged with a first voltage generated by using a voltage of the battery pack; and a transistor having a base terminal to which a drive voltage supplied from the BMIC is input, a collector terminal to which the resistor is connected, and an emitter terminal to which the capacitor is connected, and operated to supply the BMIC with a second voltage generated from a voltage of the collector terminal when a voltage of the emitter terminal does not reach a voltage level of the base terminal.

According to another embodiment, a battery system includes: a battery pack including a plurality of battery cells; a battery monitoring integrated circuit (BMIC) configured to measure each of a plurality of cell voltages of the plurality of battery cells; a main control unit (MCU) configured to receive the plurality of cell voltages and determine a target battery cell requiring a cell balancing among the plurality of battery cells; a plurality of balancing batteries charged by the cell balancing; a multiplexer (MUX) connecting the determined target battery cell to a corresponding one of the plurality of balancing batteries under a control of the MCU; a direct-current to direct-current (DC-DC) converter configured to generate an output voltage by converting each voltage input from the plurality of balancing batteries; and a power supply unit configured to supply the BMIC with a higher voltage among a voltage generated using the output voltage of the DC-DC converter and a voltage of the battery pack.

The DC-DC converter may be operated when the each voltage input from the plurality of balancing batteries is equal to or greater than a predetermined threshold voltage.

According to still another embodiment, a battery system includes: a plurality of battery packs each including a plurality of battery cells; a plurality of slave battery management systems (BMSs) configured to respectively manage the plurality of battery packs, each of the plurality of slave BMSs including a battery monitoring integrated circuit (BMIC) connected to a plurality of corresponding battery cells to measure a plurality of cell voltages, and controlling a cell balancing; a plurality of balancing batteries included in each of the plurality of slave BMSs and charged by the cell balancing; a direct-current to direct-current (DC-DC) converter configured to generate an output voltage by converting each voltage supplied from the plurality of balancing batteries; and a power supply unit configured to supply the BMIC with a higher voltage among a voltage generated using the output voltage of the DC-DC converter and a voltage of the plurality of battery packs.

The battery system may further include a master BMS configured to receive a voltage measurement signal obtained by measuring the each voltage supplied from the plurality of balancing batteries from the plurality of slave BMSs, and generate a control signal for controlling the plurality of slave BMS based on the voltage measurement signal to transmitting the control signal to the plurality of slave BMS.

The master BMS may be configured to generate the control signal including a control command for turning on the DC-DC converter when the each voltage supplied from the plurality of balancing batteries is equal to or greater than a predetermined threshold voltage.

Advantageous Effects

The present disclosure may provide the battery system which may supply power to the battery monitoring integrated circuit by using power consumed during the cell balancing operation between the plurality of battery cells in the battery pack including the plurality of battery cells. In this way, it is possible to reduce power consumption of the battery system.

DESCRIPTION OF THE DRAWINGS

FIG. 1 is a circuit diagram schematically showing a battery system according to an embodiment.

FIG. 2 is a view showing a multiplexer (MUX) according to an embodiment.

FIG. 3 is a view showing a balancing battery unit according to an embodiment.

FIG. 4 is a view schematically showing that a positive temperature coefficient (PTC) unit, a power conversion unit, and a power supply unit are connected to one another.

FIG. 5 is a circuit diagram schematically showing a battery system including a current sensor according to another embodiment.

FIG. 6 is an exemplary diagram schematically showing a connection relationship between a battery system connected to a plurality of battery packs according to still another embodiment.

FIG. 7 is a circuit diagram schematically showing an example of a detailed configuration of a slave battery management system (SBMS) in FIG. 6.

MODE FOR INVENTION

Hereinafter, embodiments disclosed in this specification are described in detail with reference to the accompanying drawings, components that are the same as or similar to each other are denoted by the same or similar reference numerals, and an overlapping description thereof is omitted. Terms "module" and/or "unit" for components described in the following description are used only to make the specification easily understood. Therefore, these terms do not have meanings or roles distinguished from each other in themselves. Further, when it is decided that a detailed description for the known art related to the present invention may obscure the gist of the present invention, the detailed description is omitted. Furthermore, it is to be understood that the accompanying drawings are provided only to allow the embodiments of the present disclosure to be easily understood, and the spirit of the present disclosure is not limited by the accompanying drawings and includes all the modifications, equivalents and substitutions included in the spirit and scope of the present disclosure.

Terms including ordinal numbers such as "first," "second" and the like, may be used to describe various components. However, these components are not limited by these terms. The terms are used only to distinguish one component from another component.

It is to be understood that terms "include," "have" and the like used in the present application specify the presence of features, numerals, steps, operations, components, parts or combinations thereof, mentioned in the specification, and do not preclude the presence or addition of one or more other features, numerals, steps, operations, components, parts or combinations thereof.

A program implemented as a set of instructions embodying a control algorithm necessary to control another configuration may be installed in a configuration for controlling another configuration under a specific control condition among configurations according to an embodiment. The control configuration may process input data and stored data, based on an installed program to generate output data. The control configuration may include a non-volatile memory to store the program and a memory storing the data.

FIG. 1 is a circuit diagram schematically showing a battery system according to an embodiment.

Referring to FIG. 1, a battery system 1 may include a battery pack 10, a battery monitoring integrated circuit 20, a main control unit 30, a plurality of multiplexers (MUXs) 40 and 41, and a balancing battery unit 50, a positive temperature coefficient (PTC) unit 60, a power conversion unit 70, a power supply unit 80, and relays 90 and 91. The battery monitoring integrated circuit is hereinafter referred to as the BMIC. The main control unit is hereinafter referred to as the MCU.

An external device 2 may include a loading or charger such as an inverter or converter. When the external device 2 is a charger, both ends of the battery system 1 may be connected to the charger and supplied with power from the charger to be charged. When the external device 2 is a load, both ends of the battery system 1 may be connected to the loading device, and power supplied by the battery pack 10 may thus be discharged through the load.

The battery pack 10 may include a plurality of battery cells 11 to 16 connected in series with each other. FIG. 1 shows that the battery pack 10 includes six battery cells 11 to 16 connected in series with each other, which is an example. The present disclosure is not limited thereto, and the battery pack may be implemented to include a plurality of battery cells in which two or more battery cells connected in series with each other and two or more battery cells connected in parallel with each other are connected in series with each other.

Hereinafter, "cell balancing" described in this specification may refer to a charge equalization operation for a battery cell having a value greater than or equal to a reference value among the plurality of battery cells 11 to 16 included in the battery pack 10. The reference value is a value set based on cell voltages of the plurality of battery cells 11 to 16 and may be a representative value of the plurality of cell voltages. The representative value may be an average value, a median value, a minimum value, or the like. A conventional charge equalization operation may be implemented by transferring a charge stored in a cell requiring the cell balancing to a battery cell having a low cell voltage, or discharging the charge stored in the cell requiring the cell balancing by using a discharge load. However, according to an embodiment, the charge equalization operation may be implemented by transferring the charge stored in the cell requiring the cell balancing to a balancing battery.

Power consumed by the BMIC 20 may be classified into monitoring power required for monitoring and standby power in a sleep state. The monitoring power is power consumed by the BMIC 20 while performing the monitoring. The standby power is power consumed by the BMIC 20 in the sleep state where the monitoring is not performed. The standby power may be consumed even during long-term transportation and storage, and both of the monitoring power and the standby power are thus to be considered when calculating the power consumption of the BMIC 20. Charging energy of each of the plurality of battery cells 11 to 16 may be reduced by the power consumption of the BMIC 20.

Hereinafter, with reference to FIGS. 1 to 5, the description describes an embodiment in which the balancing battery is charged with energy generated during the charge equalization operation of the cell requiring the cell balancing and power charged in the balancing battery is supplied to the BMIC 20.

The BMIC 20 may be connected to each battery cell of the plurality of battery cells 11 to 16, and obtain a plurality of voltage measurement signals VS1 to VS7 measured from both ends of the plurality of battery cells 11 to 16 through a plurality of input terminals P1 to P7. A positive electrode of each of the plurality of battery cells 11 to 16 (e.g., 11) may be connected to a corresponding input terminal (e.g., P1) of the plurality of input terminals P1 to P6 through a wiring, and a negative electrode of each of the plurality of battery cells 11 to 16 (e.g., 11) may be connected to a corresponding input terminal (e.g., P2) of the plurality of input terminals P2 to P7 through a wiring. For example, the measurement signal VS1 may be a positive voltage of the battery cell 11 and input to the BMIC 20 through the input terminal P1, and the measurement signal VS2 may be a negative voltage of the battery cell 11 or a positive voltage of the battery cell 12, and input to the BMIC 20 through the input terminal P2.

The BMIC 20 may transmit, to the MCU 30, a plurality of cell voltage signals indicating the cell voltages of the plurality of battery cells derived from the plurality of voltage measurement signals VS1 to VS7. For example, the BMIC may generate the cell voltage signal based on a voltage obtained by subtracting the negative voltage from the positive voltage of each of the plurality of battery cells, and transmit the generated cell voltage signal to the MCU 30.

The MCU 30 may receive the plurality of cell voltage signals, and determine a battery cell (hereinafter, a target battery cell) requiring the cell balancing among the plurality of battery cells 11 to 16 based on the plurality of cell voltage signals. The MCU 30 may control the target battery cell to be connected to the balancing battery unit 50 through the plurality of MUXs 40 and 41, then control the balancing battery unit 50 to be connected to the power conversion unit 70 through the PTC unit 60, and control the power conversion unit 70 to supply power to the BMIC 20. When the target battery cell is connected to a corresponding balancing battery of the balancing battery unit 50 through a corresponding MUX among the plurality of MUXs 40 and 41, the corresponding balancing battery may be charged by energy discharged from the target battery cell. When the balancing battery unit 50 and the power conversion unit 70 are connected with each other, the power conversion unit 70 may convert a voltage stored in the balancing battery unit 50 into a voltage suitable for driving the BMIC 20 to be supplied to the BMIC 20.

For the above controls, the MCU 30 may generate a plurality of MUX control signals MCS1 and MCS2 and transfer the same to the plurality of MUXs and 41, generate a plurality of switch control signals SC1 to SC4 and transfer the same to the PTC unit 60, and transfer the same to the power conversion unit 70 through a converter control signal (CCS). The MCU 30 may control whether the power conversion unit 70 is enabled through the converter control signal (CCS), and receive a battery signal (BS) generated from a battery ADC of the power conversion unit 70.

Each of the plurality of MUXs 40 and 41 may connect the target battery cell among the plurality of corresponding battery cells to the balancing battery unit 50. The plurality of battery cells corresponding to each of the plurality of MUXs 40 and 41 may indicate the plurality of battery cells connected to the corresponding MUX. FIG. 1 shows that the MUX 40 is connected to three battery cells 11 to 13, and the MUX 41 is connected to three battery cells 14 to 16.

The plurality of MUXs 40 and 41 (e.g., 40) may connect each of the positive and negative electrodes of the target battery cell among the connected plurality of battery cells (e.g., 11 to 13) among the plurality of battery cells 11 to 16 to a corresponding wiring 101 or 102 among a plurality of wirings 101 to 104. FIG. 1 shows the number of the plurality of MUXs 40 and 41 is two. However, the present disclosure is not limited thereto, and the battery system 1 may include one or more MUXs. Hereinafter, the description of an operation of the MUX 40 may be equally applied to that of the MUX 41.

The MUX 40 may connect the target battery cell among the plurality of corresponding battery cells 11 to 13 to the balancing battery unit 50 based on the plurality of MUX control signals MCS1. The MUX 41 may connect the target battery cell among the plurality of corresponding battery cells 14 to 16 to the balancing battery unit 50 based on the plurality of MUX control signals MCS2. The plurality of control signals MCS1 may include a plurality of switching signals MS1 to MS6 for controlling a plurality of switching elements included in the MUX circuit 40.

One ends of the relays 90 and 91 may be connected to the battery pack 10, and the other ends of the relays 90 and 91 may be connected to at least one component of the external device 2. The closing and opening of the relays 90 and 91 may be controlled based on relay control signals RSC1 and RSC2 supplied from the MCU 30.

FIG. 2 is a view showing a multiplexer (MUX) according to an embodiment. When the target battery cell is determined among the plurality of battery cells 11 to 16, the MCU 30 may generate the plurality of MUX control signals MCS1 and MCS2 for connecting the target battery cell to the balancing battery unit 50.

As shown in FIG. 2, the MUX 40 may include a plurality of switching elements 411 to 416, and each of the plurality of switching signals MS1 to MS6 may control a switching operation of a corresponding switching element. When the target battery cell is the battery cell 11 among the plurality of battery cells 11-13, the MCU 30 may generate the switching signals MS1 and MS4 among the plurality of switching signals MS1-MS6 at an on-level, and the switching elements 411 and 414 may be turned on by the on-level switching signals MS1 and MS4. The battery cell 11 may then be connected to the balancing battery unit 50 through the MUX 40. Here, off-level switching signals MS2, MS3, MS5 and MS6 may be supplied from the MCU 30 to the plurality of switching elements 412, 413, 415, and 416 connected to the battery cells 12 and 13 other than the target battery cell, and the plurality of switching elements 412, 413, 415, and 416 may be in an off state.

The MUX 41 may also include the same components as the MUX 40 and be operated in the same manner.

According to an embodiment, to select the target battery cell from the plurality of battery cells (e.g., 11 to 13) and respectively connect the positive and negative electrodes of the target battery cell to the wiring 101 and the wiring 102 may be implemented through a circuit including a field effect transistor (FET) element instead of the MUX 40.

In the balancing battery unit 50, the balancing battery may be charged by receiving energy from the target battery cell connected thereto through the wirings 101 and 102.

FIG. 3 is a view showing the balancing battery unit according to an embodiment.

Hereinafter, a detailed configuration of the balancing battery unit 50 is described with reference to FIG. 3.

The balancing battery unit 50 may include a plurality of balancing batteries 500 and 501 and a plurality of PTC elements 510 and 511.

FIG. 1 shows that the number of the plurality of balancing batteries 500 and 501 and the plurality of PTC elements 510 and 511 are two, respectively. However, the present disclosure is not limited thereto, and each number may be increased or decreased based on the number of the MUXs.

The positive electrode of the balancing battery 500 may be connected to the wiring 101, and the negative electrode of the balancing battery 500 may be connected to the wiring 102. The PTC element 510 may be disposed on the wiring 101. The PTC element 510 may be disposed on the wiring 102 unlike that shown in FIG. 3. The PTC element 510 may be implemented as a resistance element having a positive temperature coefficient. The balancing battery 500 may be charged by being connected to the target battery cell among the plurality of battery cells 11 to 13, and here, when its temperature is increased due to a charging current, the PTC element 510 may have an increased resistance to limit the charging current. For example, the PTC element 510 may have a rapidly increased resistance due to heat occurring during a short circuit, thus blocking a current flowing through the wiring 101.

The positive electrode of the balancing battery 501 may be connected to the wiring 103, and the negative electrode of the balancing battery 501 may be connected to the wiring 104. The PTC element 511 may be disposed on the wiring 103. The PTC element 511 may be disposed on the wiring 104 unlike that shown in FIG. 3. The PTC element 511 may be implemented as the resistance element having a positive temperature coefficient. The balancing battery 501 may be charged by being connected to the target battery cell among the plurality of battery cells 14 to 16, and here, when its temperature is increased due to a charging current, the PTC element 511 may have an increased resistance to limit the charging current. For example, the PTC element 511 may have a rapidly increased resistance due to heat occurring during a short circuit, thus blocking a current flowing through the wiring 103.

Hereinafter, detailed configurations of the PTC unit 60, the power conversion unit 70, and the power supply unit 80 are described with reference to FIG. 4.

FIG. 4 is a view schematically showing that the positive temperature coefficient (PTC) unit, the power conversion unit, and the power supply unit are connected to one another.

The PTC unit 60 may include four switches 601 to 604 and a PTC element 600.

The switch 601 may be connected between the wiring 105 and the wiring 110, and perform a switching operation by the switch control signal SC1, thereby controlling connection between the balancing battery 500 and an input terminal P71 of a direct-current to direct-current (DC-DC) converter 700. The switch 602 may be connected between the wiring 106 and the wiring 109, and perform a switching operation by the switch control signal SC2, thereby controlling connection between the balancing battery 500 and an input terminal P72 of the DC-DC converter 700. The switch 603 may be connected between the wiring 107 and the wiring 110, and perform a switching operation by the switch control signal SC3, thereby controlling the connection between the balancing battery 501 and the input terminal P71 of the DC-DC converter 700. The switch 604 may be connected between the wiring 108 and the wiring 109, and perform a switching operation by the switch control signal SC4, thereby controlling the connection between the balancing battery 500 and the input terminal P72 of the DC-DC converter 700.

An on-level of the plurality of switch control signals SC1 to SC4 may be a high level, and an off-level thereof may be a low level. That is, the switches 601 to 604 may be turned on based on the high-level switch control signals SC1 to SC4 and the switches 601-604 may be turned off based on the low-level switch control signals SC1 to SC4.

While the balancing battery 500 is being charged by the target battery cell through the wirings 101 and 102, the plurality of switches 601 and 602 may be turned off by the plurality of low-level switch control signals SC1 and SC2. While the balancing battery 501 is being charged by the target battery cell through the wirings 103 and 104, the plurality of switches 603 and 604 may be turned off by the plurality of low-level switch control signals SC3 and SC4.

After the balancing operation is finished, the plurality of switches 601 to 604 may be turned on by the plurality of high-level switch control signals SC1 to SC4.

When the plurality of switches 601 to 604 are turned on, the positive electrode of the balancing battery 500 may be connected to the input terminal P71 of the DC-DC converter 700 through the wirings 105 and 110, the negative electrode of the balancing battery 500 may be connected to the input terminal P72 of the DC-DC converter 700 through the wirings 106 and 109, the positive electrode of the balancing battery 501 may be connected to the input terminal P71 of the DC-DC converter 700 through the wirings 107 and 110, and the negative electrode of the balancing battery 501 may be connected to the input terminal P72 of the DC-DC converter 700 through the wirings 108 and 109.

When the plurality of switches 601 to 604 are turned on, balancing between the plurality of balancing batteries 500 and 501 may occur due to a potential difference between the plurality of balancing batteries 500 and 501. The PTC unit 60 may include the PTC element 600 to limit the balancing between the plurality of balancing batteries 500 and 501.

The PTC element 600 may be disposed on a current path between the balancing batteries 500 and 501. FIG. 4 shows that the PTC element 600 is disposed on the wiring 105. The PTC element 600 may be disposed on the wiring 107 unlike that shown in FIG. 4. When each of the plurality of switches 601 to 604 is in an on state, a balancing current may flow due to the balancing between the balancing batteries 500 and 501. The PTC element 600 may be disposed on a balancing current path, and its resistance may thus be increased as the balancing current is increased, thereby limiting the balancing current. When a short circuit occurs due to the balancing current, the PTC element 600 may have a rapidly increased resistance, thus blocking the balancing current.

The power conversion unit 70 may include the DC-DC converter 700 and an analog-to-digital converter (ADC) 710.

The ADC 710 may transmit a battery voltage measurement signal BS generated by receiving each voltage of the plurality of balancing batteries 500 and 501 to the MCU 30 through the wiring 110. The MCU 30 may check each voltage of the balancing batteries 500 and 501 after the balancing through the voltage measurement signal BS received from the ADC 710 and control the plurality of MUXs 40 and 41 to prevent each of the balancing batteries 500 and 501 from being in an overvoltage state. For example, when at least one of the balancing batteries 500 and 501 is in the overvoltage state, the MCU 30 may maintain the plurality of MUX control signals MCS1 and MCS2 at an off-level even though there is a battery cell requiring the balancing among the plurality of battery cells 11 to 16, and discharge the target battery cell through another cell balancing circuit, for example, a passive cell balancing circuit.

While measuring the voltages of the balancing batteries 500 and 501, the MCU 30 may supply an off-level voltage to a hold terminal 720 through the converter control signal (CCS) to stop an operation of the DC-DC converter 700.

The hold terminal 720 may be connected to a contact point between two resistors R1 and R2, and a voltage of the hold terminal 720 may be supplied to an enable pin P70 to control the operation of the DC-DC converter 700. For example, the DC-DC converter 700 may not be operated when the voltage of the hold terminal 720 drops to a predetermined threshold voltage or less. The voltage of the hold terminal 720 may be a voltage in which a voltage of the input terminal P71 of the DC-DC converter 700 is divided to the enable pin P70 by the two resistors R1 and R2. When the voltage of the hold terminal 720 drops to the predetermined threshold voltage or less, it may indicate that the voltage of the input terminal P71 drops to the predetermined threshold voltage or less.

Alternatively, the MCU 30 may supply the on-level converter control signal (CCS) to the hold terminal 720 to operate the DC-DC converter 700. Alternatively, the MCU 30 may supply the off-level converter control signal (CCS) to the hold terminal 720 to stop the operation of the DC-DC converter 700. In this case, the voltage of the hold terminal 720 may not follow the voltage supplied from the balancing battery unit 50.

The power conversion unit 70 may maintain an output voltage of the DC-DC converter 700 at a predetermined level through the hold terminal 720. Here, the predetermined level may be a normal level for driving the BMIC 20.

The power supply unit 80 may be operated based on a drive voltage supplied from a terminal P8 of the BMIC 20 through the wiring 112, and regulate the voltage supplied from the battery pack 10 through the wiring 113 to a power supply voltage of a level suitable for the BMIC 20 and supply the same to a terminal P9 of the BMIC 20.

The output voltage supplied from the power conversion unit 70 may be transferred to the power supply unit 80 through the wiring 111, and the power supply unit 80 may not be operated when the output voltage of the power conversion unit 70 is at the normal level. For example, the normal level may be a level suitable for driving the BMIC 20.

The power supply unit 80 may include a transistor Q1, a resistor R, and a capacitor C. One end of the resistor R may be connected to the wiring 113 connected to the positive electrode of the battery pack 10, and the other end of the resistor R may be connected to a collector terminal of the transistor Q1. An emitter terminal of the transistor Q1 may be connected to one end of the capacitor C, and the other end of the capacitor C may be connected to the ground. The drive voltage supplied from the BMIC 20 may be input to a base terminal of the transistor Q1. The BMIC 20 may receive a voltage charged in the capacitor C of the power supply unit 80 as the power supply voltage, and regulate the power supply voltage by controlling a switching operation of the transistor Q1 based on a level of the power supply voltage.

An output terminal of the DC-DC converter 700 may be connected to a contact point between the emitter terminal of the transistor Q1 and one end of the capacitor C through the wiring 111. Here, when the output voltage of the DC-DC converter 700 is at the normal level, the output voltage of the DC-DC converter 700 may be greater than or equal to the drive voltage. That is, the transistor Q1 of the power supply unit 80 may not be operated when the output voltage of the DC-DC converter 700 is at the normal level. Accordingly, the power supply voltage may not be supplied from the power supply unit 80 to the BMIC 20, and the output voltage of the DC-DC converter 700 may become the power supply voltage of the BMIC 20. The output voltage of the DC-DC converter 700 may be supplied to the BMIC 20 through the wiring 111 as it is when the output voltage of the DC-DC converter 700 is at the normal level. In addition, the transistor Q1 of the power supply unit 80 may be operated when the output voltage of the DC-DC converter 700 drops to a level lower than the normal level. The power supply voltage may then be supplied to the BMIC 20 from the power supply unit 80 instead of the output voltage of the DC-DC converter 700. Therefore, the power supply unit 80 may supply the BMIC 20 with a higher voltage among the voltage generated using the voltage of the output terminal of the DC-DC converter 700 and the voltage of the battery pack 10 as the power supply voltage.

FIG. 5 is a circuit diagram schematically showing a battery system including a current sensor according to another embodiment.

Referring to FIG. 5, the battery system 1000 may include current sensors 51 and 52 disposed between the plurality of MUXs 40 and 41 and the balancing battery unit 50.

The battery system 1000 of FIG. 5 may be regarded as the same as the battery system 1 of FIG. 1 except that the current sensor 51 is added, and redundant descriptions thereof are thus omitted.

The current sensor 51 may check an amount of a current flowing through a wiring to which the target battery cell and the balancing batteries 500 and 501 are connected with each other. FIG. 5 shows that the current sensor 51 is disposed on the wiring 101, and the current sensor 52 is disposed on the wiring 103. However, the present disclosure is not limited thereto, and the current sensor 51 may be disposed on at least one of the wirings 101 to 104 to which the target battery cell and the balancing battery are connected. The current sensors 51 and 52 may be implemented as hall sensors. The current sensors 51 and 52 may measure the current flowing through the wirings 101 and 103 to generate a current measurement signal (not shown) and transmit the same to the MCU 30. The MCU 30 may detect the charging current of the balancing batteries 500 and 501 based on the received current measurement signal, estimate the charging amount of the balancing batteries 500 and 501, or detect an overcurrent to control a protection operation.

Hereinafter, the description describes a case where a battery system includes a plurality of battery packs with reference to FIGS. 6 and 7.

FIG. 6 is an exemplary diagram schematically showing a connection relationship between the battery system connected to the plurality of battery packs according to still another embodiment.

A battery system 2000 may include a plurality of battery packs 100, 200, and 300, a master battery management system (MBMS) 21, and a plurality of slave battery management systems (SBMSs) 22 to 24. Each of the plurality of battery packs 100, 200, and 300 is shown as including six battery cells connected in series with one another, which is an example. The present disclosure is not limited thereto, and each of the plurality of battery packs 100, 200, and 300 may be implemented as a plurality of battery cells in which two or more battery cells in series with each other and two or more battery cells connected in parallel with each other are connected in series with each other. FIG. 6 shows that the battery system 2000 includes three battery packs 100, 200, and 300 connected in series with one another, which is an example. The present disclosure is not limited thereto, and the battery system 2000 may include two or more battery packs.

Referring to FIG. 6, when the battery system includes the plurality of battery packs 100, 200, and 300, a corresponding SBMS 22 among the plurality of SBMSs 22 to 24 may be connected to each of the plurality of battery packs 100, 200, and 300 (e.g., 100). Each of the plurality of SBMSs 22 to 24 (e.g., 22) may be connected to each of a plurality of battery cells of the corresponding battery pack (e.g., 100).

The MBMS 21 may perform the function performed by the MCU 30 according to an embodiment shown in FIGS. 1 and 5. The plurality of SBMSs 22 to 24 may measure information necessary for managing the battery system 2000, (for example, a plurality of cell voltages or a temperature of the battery pack), and transmit a signal indicating a measurement result to the MBMS 21 through wired/wireless communication. FIG. 6 shows that the MBMS 21 and the plurality of SBMSs 22 to 24 are connected to each other in a daisy chain structure, which is an example. The present disclosure is not limited thereto, and the MBMS 21 and the plurality SBMSs 22 to 24 may be directly or indirectly connected to each other for the wired/wireless communication.

FIG. 7 is a circuit diagram schematically showing an example of a detailed configuration of the SBMS in FIG. 6. Although the BMS 22 of FIG. 7 is shown as relating to one SBMS 22 among the plurality of SBMSs 22 to 24 in FIG. 6, the same may be applied to each of the plurality of SBMSs 22 to 24.

The operation of controlling the plurality of MUXs 40 and 41, the PTC unit 60, and the power conversion unit 70 by the MCU 30 in the battery system 1 and 1000 shown in FIGS. 1 and 5 may be implemented by controlling a plurality of MUXs 40 and 41, a PTC unit 60, and a power conversion unit 70 shown in FIG. 7 by an MBMS 21 in the battery system 2000 shown in FIG. 6.

A BMIC 220 may generate a slave signal (SS) including a plurality of cell voltages of a plurality of battery cells 1001 to 1006, a temperature of the battery pack 100, a battery signal (BS) received from a battery ADC of the power conversion unit 70, and the like, and transmit the same to the MBMS 21.

The MBMS 21 may generate a control signal (CS) for controlling the plurality of SBMSs 22 to 24 based on the slave signals (SSs) received from the plurality of SBMSs 22 to 24. The MBMS 21 may transmit the generated control signal (CS) to the plurality of SBMSs 22 to 24. The control signal (CS) may include a plurality of MUX control signals MCS1 and MCS2, a plurality of switch control signals SC1 to SC4, and a converter control signal (CCS).

The MBMS 21 may determine a target battery cell requiring cell balancing among the plurality of battery cells 1001 to 1006, control the plurality of MUXs 40 and 41 for the target battery cell to be connected to a balancing battery unit 50 through the plurality of MUXs 40 and 41, and then connected to the power conversion unit 70 through the PTC unit 60, control the power conversion unit 70 to supply power to the BMIC 220. The MBMS 21 may generate a signal CS including a control command for the above control and transmit the same to the SBMS 22. The MBMS 21 may generate the control command corresponding to each SBMS in the same manner for the SBMSs 23 and 24 as well as the SBMS 22, generate the signal CS including the control commands corresponding to the plurality of SBMSs 22 to 24, and transmit the same to the plurality of SBMSs 22 to 24.

The BMIC 220 may generate the plurality of MUX control signals MCS1 and MCS2 based on the signal CS received from the MBMS 21, transfer the same to the plurality of MUXs 40 and 41, generate the plurality of switch control signals SC1 to SC4 and transmit the same to the PTC unit 60, and transfer the same to the power conversion unit 70 through the converter control signal (CCS). The BMIC 220 may control whether the power conversion unit 70 is enabled through the converter control signal (CCS).

When the target battery cell is connected to a corresponding balancing battery of the balancing battery unit 50 through a corresponding MUX among the plurality of MUXs 40 and 41, the corresponding balancing battery may be charged by energy discharged from the target battery cell. When the balancing battery unit 50 and the power conversion unit 70 are connected with each other, the power conversion unit 70 may convert a voltage stored in the balancing battery unit 50 into a voltage suitable for driving the BMIC 220 to be supplied to the BMIC 220.

For example, an input voltage input to the power conversion unit 70 of the SBMS 22 based on the slave signal (SS) may be a predetermined voltage or more. In this case, the MBMS 21 may transmit the control signal (CS) including the control command for enabling the power conversion unit 70 to the BMIC 220 for BMIC 220 to receive power from the power conversion unit 70. The BMIC 220 may generate the converter control signal (CCS) enabling the power conversion unit 70 based on the control signal (CS), and transmit the same to the power conversion unit 70.

In addition, at least one of the plurality of balancing batteries included in the balancing battery unit 50 of the SBMS 22 based on the slave signal (SS) may be in an overvoltage state. In this case, the MBMS 21 may transmit, to the BMIC 220, the control signal (CS) including the control command for the BMIC 220 not to operate the plurality of MUXs 40 and 41. Even though there is a battery cell requiring the balancing among the plurality of battery cells 1001 to 1006 based on the control signal (CS), the BMIC 220 may generate the plurality of off-level MUX control signals MCS1 and MCS2 for maintaining the plurality of MUXs 40 and 41 in an off state and transfer the same to the plurality of MUXs 40 and 41.

Although the embodiments of the present invention have been described in detail hereinabove, the scope of the present invention is not limited thereto. Various modifications and improvements made by those skilled in the art to which the present invention pertains also belong to the scope of the present invention.

The invention claimed is:

1. A battery system comprising:
a battery pack including a plurality of battery cells;
a battery monitoring integrated circuit (BMIC) configured to monitor each of a plurality of cell voltages of the plurality of battery cells;
a plurality of balancing batteries each charged by a target battery cell requiring a cell balancing among the plurality of battery cells;
a power conversion unit including a direct-current to direct-current (DC-DC) converter receiving voltages from the plurality of balancing batteries and configured to convert the voltages into output voltages; and
a power supply unit configured to supply the output voltages to the BMIC when the output voltage have a voltage equal to or greater than a predetermined level for driving the BMIC.

2. The battery system of claim 1, wherein when the output voltages are less than the predetermined level for driving the BMIC, the power supply unit regulates the voltages supplied from the battery pack to a voltage of the predetermined level for driving the BMIC and supplies the voltages to the BMIC.

3. The battery system of claim 1, further comprising a plurality of multiplexers (MUXs) connecting the target battery cell requiring the cell balancing among the plurality of battery cells to one of the plurality of balancing batteries.

4. The battery system of claim 1, wherein the power conversion unit operates the DC-DC converter when each voltage output from the plurality of balancing batteries is equal to or greater than a predetermined threshold voltage.

5. The battery system of claim 1, wherein the power conversion unit further includes an analog-to-digital converter (ADC) configured to generate a voltage measurement signal by measuring the voltages output from the plurality of balancing batteries, and
wherein, whether the plurality of balancing batteries are charged by the target battery cell is controlled based on the voltage measurement signal.

6. The battery system of claim 5, wherein the power conversion unit is not operated while the ADC measures the voltages output from the plurality of balancing batteries.

7. The battery system of claim 1, further comprising a positive temperature coefficient (PTC) element disposed on a current path in which one of the plurality of balancing batteries is charged by the cell balancing of the target battery cell.

8. The battery system of claim 1, further comprising a positive temperature coefficient (PTC) element disposed on a current path between the plurality of balancing batteries when the plurality of balancing batteries are connected in parallel with each other.

9. The battery system of claim 1, wherein the power supply unit includes:
a resistor connected to a wiring connected to the battery pack;
a capacitor charged with a first voltage generated by using a voltage of the battery pack; and
a transistor having a base terminal to which a drive voltage supplied from the BMIC is input, a collector terminal to which the resistor is connected, and an emitter terminal to which the capacitor is connected, and operated to supply the BMIC with a second voltage generated from a voltage of the collector terminal when a voltage of the emitter terminal does not reach a voltage level of the base terminal.

10. A battery system comprising:
a battery pack including a plurality of battery cells;
a battery monitoring integrated circuit (BMIC) configured to measure each of a plurality of cell voltages of the plurality of battery cells;
a main control unit (MCU) configured to receive the plurality of cell voltages and determine a target battery cell requiring a cell balancing among the plurality of battery cells;
a plurality of balancing batteries charged by the cell balancing;
a multiplexer (MUX) connecting the determined target battery cell to a corresponding one of the plurality of balancing batteries under a control of the MCU;
a direct-current to direct-current (DC-DC) converter configured to generate an output voltage by converting each voltage input from the plurality of balancing batteries; and
a power supply unit configured to supply the BMIC with a higher voltage among a voltage generated using the output voltage of the DC-DC converter and a voltage of the battery pack.

11. The battery system of claim 10, wherein the DC-DC converter is operated when the each voltage input from the plurality of balancing batteries is equal to or greater than a predetermined threshold voltage.

12. A battery system comprising:
a plurality of battery packs each including a plurality of battery cells;
a plurality of slave battery management systems (BMSs) configured to respectively manage the plurality of battery packs, each of the plurality of slave BMSs including a battery monitoring integrated circuit (BMIC) connected to a plurality of corresponding battery cells to measure a plurality of cell voltages, and controlling a cell balancing;
a plurality of balancing batteries included in each of the plurality of slave BMSs and charged by the cell balancing;
a direct-current to direct-current (DC-DC) converter configured to generate an output voltage by converting each voltage supplied from the plurality of balancing batteries; and
a power supply unit configured to supply the BMIC with a higher voltage among a voltage generated using the output voltage of the DC-DC converter and a voltage of the plurality of battery packs.

13. The battery system of claim 12, further comprising a master BMS configure to receive a voltage measurement signal obtained by measuring the each voltage supplied from the plurality of balancing batteries from the plurality of slave BMSs, and generate a control signal for controlling the plurality of slave BMS based on the voltage measurement signal to transmit the control signal to the plurality of slave BMS.

14. The battery system of claim 13, wherein the master BMS is configured to generate the control signal including a control command for turning on the DC-DC converter when the each voltage supplied from the plurality of balancing batteries is equal to or greater than a predetermined threshold voltage.

* * * * *